(12) United States Patent
Holt et al.

(10) Patent No.: US 7,741,395 B2
(45) Date of Patent: Jun. 22, 2010

(54) LOW VOLATILE ORGANIC CONTENT VISCOSITY REDUCER

(75) Inventors: Mark Holt, Huntersville, NC (US); Martin James Stimpson, Marlborough (GB)

(73) Assignee: Eastman Chemical Company, Kingsport, TN (US)

( * ) Notice: Subject to any disclaimer, the term of this patent is extended or adjusted under 35 U.S.C. 154(b) by 174 days.

(21) Appl. No.: 11/842,631

(22) Filed: Aug. 21, 2007

(65) Prior Publication Data

US 2009/0054574 A1  Feb. 26, 2009

(51) Int. Cl.
*C08K 5/09* (2006.01)

(52) U.S. Cl. ............................ 524/306; 524/314
(58) Field of Classification Search ............ 524/306, 524/314
See application file for complete search history.

(56) References Cited

U.S. PATENT DOCUMENTS

| | | |
|---|---|---|
| 2,625,563 A | 1/1953 | Bell |
| 3,624,051 A | 11/1971 | Bauer et al. |
| 3,876,762 A | 4/1975 | Rabussier et al. |
| 3,975,338 A | 8/1976 | Tsubota et al. |
| 4,070,398 A | 1/1978 | Lu |
| 4,097,440 A | 6/1978 | Maximovich et al. |
| 4,119,743 A | 10/1978 | Lu |
| 4,151,317 A | 4/1979 | Burba et al. |
| 4,227,042 A | 10/1980 | Lueddecke et al. |
| 4,228,061 A | 10/1980 | Plueddemann |
| 4,248,761 A | 2/1981 | Plueddemann |
| 4,279,789 A | 7/1981 | Lueddecke et al. |
| 4,299,752 A | 11/1981 | Armour |
| 4,369,283 A | 1/1983 | Altschuler |
| 4,396,672 A | 8/1983 | Adesko |
| 4,397,989 A | 8/1983 | Adesko |
| 4,401,720 A | 8/1983 | Davis et al. |
| 4,423,178 A | 12/1983 | Renshaw |
| 4,656,214 A | 4/1987 | Wickson |
| 4,699,940 A | 10/1987 | Gerace et al. |
| 4,721,773 A | 1/1988 | Yoshida et al. |
| 4,735,743 A | 4/1988 | Hanin et al. |
| 4,900,771 A | 2/1990 | Gerace et al. |
| 4,981,755 A | 1/1991 | Cascino |
| 4,988,768 A | 1/1991 | Gola et al. |
| 5,006,585 A | 4/1991 | DiBella |
| 5,032,432 A | 7/1991 | Huynh-Tran |
| 5,039,728 A | 8/1991 | DiBella |
| 5,039,768 A | 8/1991 | Gerace et al. |
| 5,073,425 A | 12/1991 | Dees, Jr. et al. |
| 5,143,650 A | 9/1992 | Gerace et al. |
| 5,153,342 A | 10/1992 | DiBella |
| 5,178,912 A | 1/1993 | Piacente et al. |
| 5,210,066 A | 5/1993 | Sakurai et al. |
| 5,223,106 A | 6/1993 | Gerace et al. |
| 5,243,069 A | 9/1993 | Emmons |
| 5,248,562 A | 9/1993 | Palermo et al. |
| 5,298,542 A | 3/1994 | Nakamura et al. |
| 5,319,028 A | 6/1994 | Nakamura et al. |
| 5,324,762 A | 6/1994 | Overend et al. |
| 5,349,049 A | 9/1994 | Nishina et al. |
| 5,378,758 A | 1/1995 | Amici et al. |
| 5,614,275 A | 3/1997 | Chan |
| 5,621,033 A | 4/1997 | Lindner |
| 5,627,231 A | 5/1997 | Shalov et al. |
| 5,668,209 A | 9/1997 | Ruch et al. |
| 5,674,933 A | 10/1997 | Ngoc et al. |
| 5,686,147 A | 11/1997 | Ngoc |
| 5,698,139 A | 12/1997 | Alper |
| 5,710,199 A | 1/1998 | Hubert et al. |
| 5,728,332 A | 3/1998 | Frisch et al. |
| 5,733,630 A | 3/1998 | Frisch et al. |
| 5,739,203 A | 4/1998 | Ngoc |
| 5,759,727 A | 6/1998 | Malhotra |
| 5,830,937 A | 11/1998 | Shalov et al. |
| 5,840,236 A | 11/1998 | Ngoc |
| 6,054,524 A | 4/2000 | Breton et al. |
| 6,103,309 A | 8/2000 | Rinka et al. |
| 6,162,504 A | 12/2000 | Hubert et al. |
| 6,287,679 B1 | 9/2001 | Pappas et al. |

(Continued)

FOREIGN PATENT DOCUMENTS

DE  20321027 U1  9/2005

(Continued)

OTHER PUBLICATIONS

Notification of Transmittal of the International Search Report and the Written Opinion of the International Searching Authority, or the Declaration date of mailing Jan. 5, 2009 received from corresponding International Application No. PCT/US2008/009426.

(Continued)

*Primary Examiner*—Peter D Mulcahy
(74) *Attorney, Agent, or Firm*—Brett L Nelson; Bernard J. Graves, Jr.

(57) ABSTRACT

Low VOC viscosity reducer (LVVR) compounds useful for reducing the viscosity of plastisol compositions. The plastisol compositions are combined with a viscosity reducing compound which is derived from the reaction of at least one of 2,2,4-trimethyl-1,3-pentane diol (TMPD) and 2,2,4-trimethyl-1,3-pentanediol monoisobutyrate (TXOL) with at least one of a carboxylic acid or a fatty acid.

28 Claims, 2 Drawing Sheets

U.S. PATENT DOCUMENTS

| | | | |
|---|---|---|---|
| 6,355,711 | B1 | 3/2002 | Godwin et al. |
| 6,392,011 | B1 | 5/2002 | Nakamura et al. |
| 6,425,948 | B1 | 7/2002 | Nowak et al. |
| 6,429,244 | B1 | 8/2002 | Rinka et al. |
| RE37,951 | E | 12/2002 | Hubert et al. |
| 6,495,626 | B1 | 12/2002 | Overend et al. |
| 6,498,209 | B1 | 12/2002 | Loehden et al. |
| 6,500,873 | B2 | 12/2002 | Moran et al. |
| 6,548,109 | B1 | 4/2003 | Hagquist et al. |
| 6,566,441 | B1 | 5/2003 | Lohden et al. |
| 6,605,649 | B2 | 8/2003 | Moran et al. |
| 6,608,115 | B2 | 8/2003 | Moran et al. |
| 6,703,436 | B2 | 3/2004 | Lee et al. |
| 6,849,312 | B1 | 2/2005 | Williams |
| 6,894,108 | B1 | 5/2005 | Kasai et al. |
| 6,933,337 | B2 | 8/2005 | Lang et al. |
| 6,989,409 | B2 | 1/2006 | Loehden et al. |
| 7,011,821 | B2 | 3/2006 | Amato et al. |
| 7,071,252 | B2 | 7/2006 | Stanhope et al. |
| 7,086,732 | B2 | 8/2006 | Kasperchik et al. |
| 2002/0056936 | A1 | 5/2002 | Moran et al. |
| 2002/0154873 | A1 | 10/2002 | Sheu |
| 2002/0187341 | A1 | 12/2002 | Ko et al. |
| 2003/0013828 | A1 | 1/2003 | Shimada et al. |
| 2003/0015279 | A1 | 1/2003 | Kusek |
| 2003/0100620 | A1 | 5/2003 | Moran et al. |
| 2003/0100622 | A1 | 5/2003 | Moran et al. |
| 2003/0124154 | A1 | 7/2003 | Amato et al. |
| 2003/0147838 | A1 | 8/2003 | Amato et al. |
| 2003/0157150 | A1 | 8/2003 | Lee |
| 2004/0001941 | A1 | 1/2004 | Kusek |
| 2004/0029980 | A1 | 2/2004 | Stumphauzer et al. |
| 2004/0034143 | A1 | 2/2004 | Hubert et al. |
| 2004/0039106 | A1 | 2/2004 | Man et al. |
| 2004/0059023 | A1 | 3/2004 | Loehden et al. |
| 2004/0131787 | A1 | 7/2004 | Fang |
| 2004/0132882 | A1 | 7/2004 | Stanhope et al. |
| 2004/0229986 | A1 | 11/2004 | Pearce |
| 2005/0019359 | A1 | 1/2005 | Amato et al. |
| 2005/0020718 | A1 | 1/2005 | Gosse et al. |
| 2005/0113511 | A1* | 5/2005 | Mead et al. ............... 524/569 |
| 2006/0014868 | A1 | 1/2006 | Mae et al. |
| 2006/0051590 | A1 | 3/2006 | Peters et al. |
| 2006/0052524 | A1 | 3/2006 | Peters et al. |
| 2006/0135666 | A1 | 6/2006 | Bueno de Almeida et al. |
| 2006/0142448 | A1 | 6/2006 | Choi et al. |
| 2006/0177767 | A1 | 8/2006 | Lee |
| 2006/0229394 | A1 | 10/2006 | Kim et al. |
| 2007/0006961 | A1 | 1/2007 | Kusek |
| 2007/0027244 | A1 | 2/2007 | Schar et al. |
| 2007/0036970 | A1 | 2/2007 | Stumphauzer et al. |
| 2007/0037926 | A1 | 2/2007 | Olsen et al. |
| 2007/0037929 | A1 | 2/2007 | Joo et al. |

FOREIGN PATENT DOCUMENTS

| | | | |
|---|---|---|---|
| EP | 1 541 625 A1 | 6/2005 | |
| EP | 1535958 A1 | 6/2005 | |
| GB | 1175826 A | 12/1969 | |
| JP | 61115941 A | 6/1986 | |
| JP | 03239776 A | 10/1991 | |
| JP | 06212057 A | 8/1994 | |
| JP | 07179712 A | 7/1995 | |
| JP | 07207100 A | 8/1995 | |
| JP | 2001187834 A | 7/2001 | |
| JP | 2001187835 A | 7/2001 | |
| JP | 2001214022 A | 8/2001 | |
| JP | 2002249537 A | 9/2002 | |
| JP | 2002322337 A | 11/2002 | |
| JP | 2003246908 A | 9/2003 | |
| JP | 2004107477 A | 4/2004 | |
| JP | 2005232381 A | 9/2005 | |
| JP | 2006249331 A | 9/2006 | |
| JP | 2006282709 A | 10/2006 | |
| JP | 2006299195 A | 11/2006 | |
| JP | 2007039659 | 2/2007 | |
| KR | 10 2007 0009837 A | 1/2007 | |
| WO | WO 2004007605 A1 | 1/2004 | |
| WO | WO 2005017031 A1 | 2/2005 | |

OTHER PUBLICATIONS

Saratomer Application Bulletin, "Functional Acrylic Monomers as Modifiers for PVC Plastisol Formulations"; 6 pgs.; 1997; Retrieved from the Internet: <URL:www.sartomer.com/TechLit/5510.pdf> on Mar. 13, 2007.

Bohnert et al. "Benzoate plasticizer for reducing plastisol viscosity and fusion temperature" (Abstract); 2000; Retrieved from the Internet: URL:http://.cat.inist.fr/?aModele=afficheN&cpsidt=14176116 on Mar. 13, 2007.

Wadey et al.; Journal of Vinyl and Additive Technology; "The nonyl phythalate ester and its use in flexible PVC"(Abstract); Sep. 2004; Retrieved from the Internet: <URL:www3.interscience.wiley.com/cgi-bin/abstract/109611213/ABSTRACT?CRETRY=1&SRETY=0> on Mar. 12, 2007.

Weaver; Journal of Vinyl and Additive Technology; "Functional acrylic monomers as modifiers for PVC plastisol formulations"(Abstract); Sep. 2004; Retrieved from the Internet: <URL:www3.interscience.wiley.com/cgi-bin/abstract/10961161/ABSTRACT> on Mar. 12, 2007.

Plasticizers—Free Online Library; 7 pgs; Retrieved from the Internet: <URL:www.thefreelibrary.com/Plasticizers-a0153912224> on Mar. 13, 2007.

Akcros antistatic agents and viscosity modifiers; "Other Additives" 1 pg.; Retrieved from the Internet: <URL:www.akcros.com/PVC+Products/Product+Information-Europe/Other/> on Mar. 13, 2007.

Velsicol Chemical Corporation; "Benzoate Esters"; 2 pgs.; Retrieved from the Internet: <URL:www.velsicol.com/asps/documents/pdbr/BE.pdf> on Mar. 13, 2007.

Plastics Additives Handbook; "PVC Stabilizers"; pp. 446-466; Retrieved from the Internet: <URL:http//files.hanser.de/hanser/docs/20040401_2445154524-474_3-44619579-3.pdf> on Mar. 13, 2007.

Eastman Plasticizer Technical Tip; 8 pgs.; Aug. and Sep. 2006; Retrieved from the Internet: <URL:www.eastman.com/NR/rdonlyres/BD441F6D-98F5-4BF2-821F-AF8B9BE9CA96/0/TT7.pdf> on Mar. 13, 2007.

Co-pending U.S. Appl. No. 11/938,515, filed Nov. 12, 2007, Holt et al.

Notification of Transmittal of the International Search Report and the Written Opinion of the International Searching Authority, or the Declaration date of mailing Feb. 12, 2009 received from corresponding International Application No. PCT/US2008/012267.

* cited by examiner

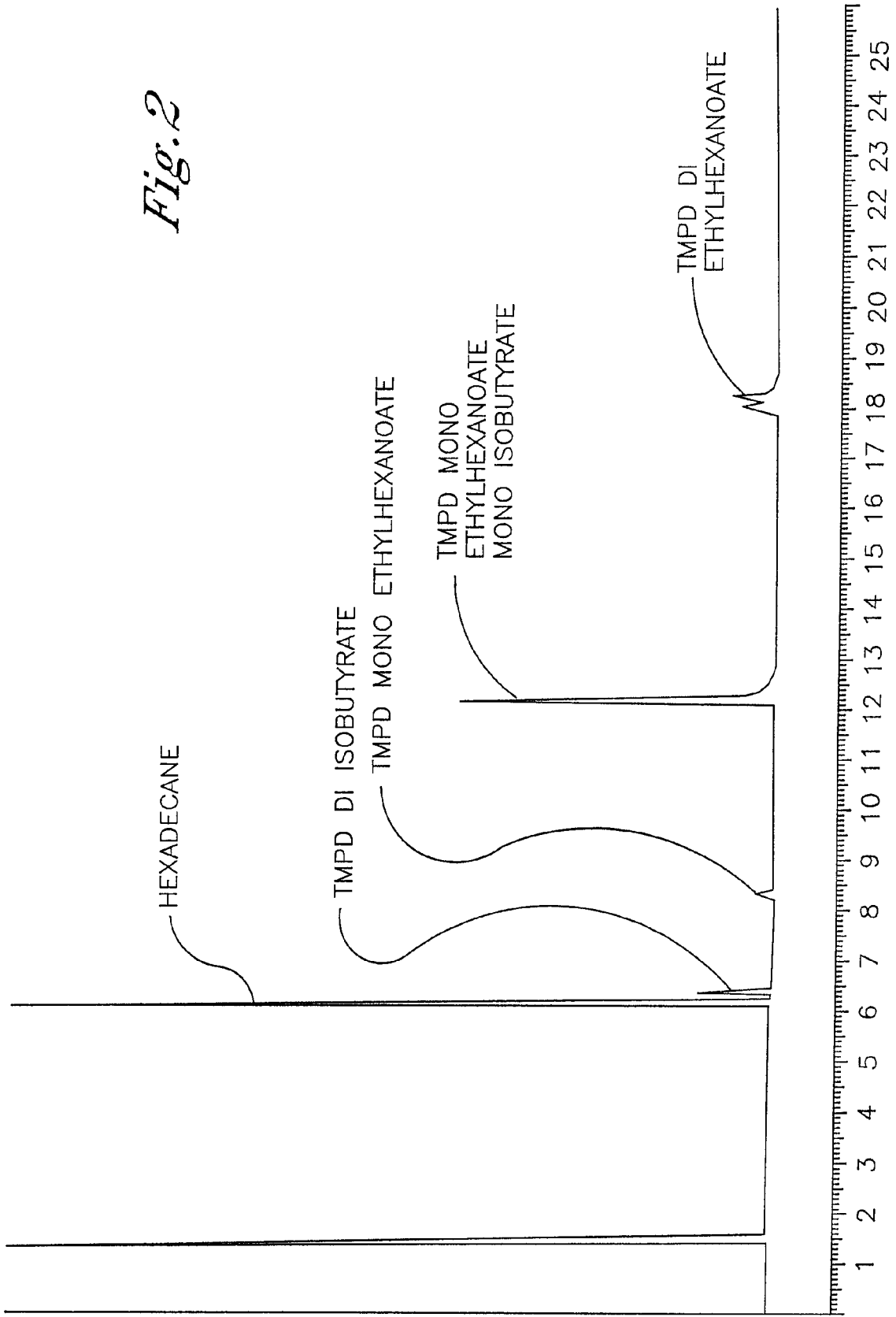

LOW VOLATILE ORGANIC CONTENT VISCOSITY REDUCER

FIELD OF THE INVENTION

The present invention relates to polyvinylchloride (PVC) plastisols which include esters of 2,2,4-trimethyl-1,3-pentane diol (TMPD) for reducing the viscosity of the plastisols, and methods of preparing the plastisol compositions.

BACKGROUND OF THE INVENTION

Historically, plasticizers have been used in plastisol formulations to reduce the viscosity of the plastisol formed. The resultant plastisol also exhibited excellent viscosity stability. Indoor Air Quality (IAQ) concerns and Volatile Organic Content (VOC) regulations over the past 10 years have greatly increased pressure on volatile compounds in vinyl and other compounds. Plastisol formulators have had to reformulate using more volatile compounds, for example white spirits, or expensive viscosity reducing agents and Rheology modifiers such as Viscobyk 5050. Recent regulation, including the German Institute of Structural Engineering (DIBT), has set forth VOC emission limits guidelines that will further limit the volatile emissions from building products. New compounds are thus needed to make low VOC plastisols that produce low emission polyvinyl chloride (PVC) products such as resilient vinyl flooring, floor tiles, fabric coating, adhesives, vinyl foams, home furnishings, toys and child care articles, gloves, shoes, building and construction, automotive, apparel, recreation, tools, novelties, vinyl wall coverings, etc.

SUMMARY OF THE INVENTION

A first embodiment of the present invention relates to a polyvinyl chloride (PVC) plastisol composition comprising a polyvinylchloride resin, a plasticizer, and a viscosity reducing compound, wherein said compound is represented by the following structure:

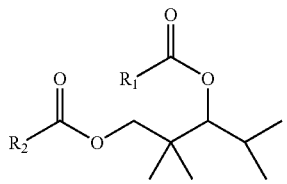

wherein $R_1$ and $R_2$ each independently represent a C3 to C17 alkyl group.

Another embodiment of the present invention relates to a polyvinyl chloride (PVC) plastisol composition comprising a polyvinylchloride resin, a plasticizer, and a viscosity reducing compound, wherein said compound is derived from the reaction of at least one of 2,2,4-trimethyl-1,3-pentane diol (TMPD) and 2,2,4-trimethyl-1,3-pentanediol monoisobutyrate (TXOL); and at least one of a carboxylic acid and a fatty acid.

Yet another embodiment of the present invention relates to a method of producing a polyvinyl chloride (PVC) plastisol composition having a reduced viscosity comprising contacting the plastisol composition and a viscosity reducing compound, wherein said compound is represented by the following structure:

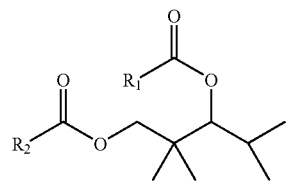

wherein $R_1$ and $R_2$ each independently represent a C3 to C17 alkyl group.

Still another embodiment relates to a method of producing a polyvinyl chloride plastisol composition having a reduced viscosity comprising contacting the plastisol composition and a viscosity reducing compound, wherein said compound is derived from the reaction of at least one of 2,2,4-trimethyl-1,3-pentane diol (TMPD) and 2,2,4-trimethyl-1,3-pentanediol monoisobutyrate (TXOL); and at least one of a carboxylic acid and a fatty acid.

BRIEF DESCRIPTION OF THE DRAWINGS

FIG. 2 shows a graph which shows the performance of the experimental compounds compared to Hexadecane.

DETAILED DESCRIPTION

Figure 1:
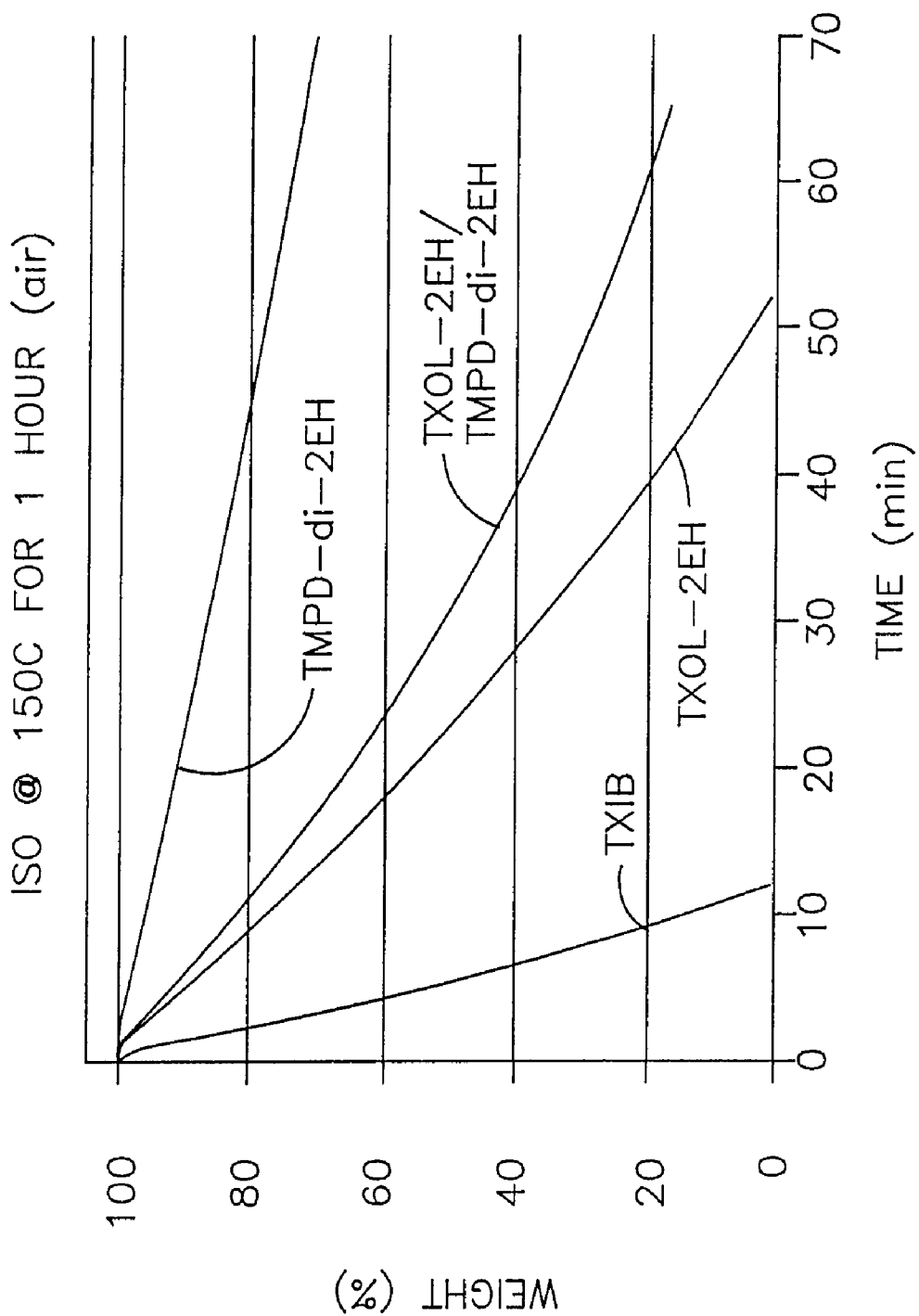
FIG. 1 shows TGA curves of three plastisols according to the present invention and TXIB.

By conventional definition a PVC plastisol is comprised of a mixture of a PVC resin with a plasticizer. Such plastisols can also include blending resins. Both PVC resins and blending resins having molecular weights ranging from 60,000 to 200,000 are applicable in this invention. Commonly used PVC copolymers are vinyl chloride-vinyl acetate copolymers. Other comonomers with PVC include: vinylidene chloride, acrylonitrile, diethyl maleate, maleic anhydride, ethylene, propylene and other ester monomers. Polymers other than PVC may also be incorporated into the formulations to improve other performance. These include, but are not limited to, poly(methyl methacrylate), styrene-butadiene rubber or any other thermoplasts.

A non-exhaustive list of commonly used plasticisers are includes DOP (dioctyl phthalate or di 2 ethyl hexyl(eh) phthalate), DIOP (diisooctyl phthalate), DINP (diisononyl phthalate), Di linear nonyl phthalate, di linear nonyl, undecyl phthalate, dilinear undecyl phthalate, DUP (diundecyl phthalate), DIDP (diisodecylpthalate), C6-C10 Straight-Chain Phthalate, C7/C9/C11 Linear Phthalate, Ditridecyl Phthalate (DTDP), UDP (undecyl dodecyl phthalate), DPHP (di(2-propylheptyl phthalate), Nonylundecyl phthalate (mix of 9 and 11 carbon alcohols used to make phthalate, Palatinol 911 is an example), texanolbenzylphthalate, polyester phthalate, diallylphthalate, n-butylphthalyl-n-butyl glycosate, dicaprylphthalate, butylcyclohexyl phthalate, dicyclohexyl phthalate, butyl octyl phthalate, DOTP (dioctyl or di 2EH terephthalate. DOA (dioctyl or di 2eh adipate), DINA (diisononyl adipate), DIOA (diisooctyl adipate), DIDA (diisodecyl adipate), DTDA (di tridecyl adipate), dibutoxyethyl adipate, dibutoxyethoxy adipate, di(noctyl, ndecyl)adipate, polyester adipate (also a polymeric), TOTM (trioctyl or tri 2 eh trimellitate), TIOTM (Triisooctyl Trimellitate), TINTM (tri isononyl trimellitate), TIDTM (triisodecyl trimellitate), THTM (trin-hexyl trimellitate), TXIB, dioctyl azelate, di2ethylhexyl glutarate, di2ethyl hexyl sebecate, dibutyl sebecate, dibutoxyethyl sebecate, triethyl citrate, acetyl triethyl citrate, tri-n-butyl citrate, acetylri-n-butyl citrate, acetyltri-n-hexyl citrate, n-butyl tri-n-hexyl citrate, isodecyl benzoate, 1,4 CHDM dibenzoate, tmpd dibenzoate, pentaerythritol tetrabenzoate, glycerol tribenzoate, polypropylene glycol dibenzoate, NPG dibenzoate, polymers of adipic acid/phthalates/adipates/sebecates/with glycols and often acid terminated. Eg, poly glycol adipates, triarylphosphates, DINCH (diisononyl cyclohexane 1,2 dicarboxylate), Mesamoll and mesamoll II, Grindsted's Soft-n-Safe, BBP (butyl benzyl phthalate), alkylbenzyl phthalate or C7-C9 butyl phthalate (santicizer 261 or 261 A an example), Diethylene Glycol Dibenzoate (Benzoflex 2-45 a commercial example), di propylene glycol dibenzoate, 2 Ethylhexyl benzoate, Texanolbenzoate, ethylene glycol dibenzoate, propylene glycol dibenzoate, triethylene glycol dibenzoate, di heptyl phthalate (jayflex 77 an example), DHP (dihexyl phthalate), DMP (dimethyl phthalate), DEP (diethyl phthalate), DBP (dibutyl phthalate), and DIBP (diisobutyl phthalate).

The PVC plastisols (except with the addition of the viscosity reducers of the present invention) as used in this invention are formulated in the conventional way with inert fillers, extenders, rheological additives, heat stabilizers or UV stabilizers. Examples of fillers include calcium carbonate, calcium silicate, talc, clay, calcium sulfate, calcium oxide, magnesium oxide, titanium oxide, zinc oxide, diatomaceous earth, molecular sieves or others commonly used in PVC plastisol formulations. Rheological additives can be silica based thixotropes or clay derivatives. By filled PVC plastisols, it is meant herein, PVC resin and blending resins plus plasticizer and fillers or additives in conventional proportions, typically 20-50 weight percent of each ingredient.

This invention relates to low volatile organic content (VOC) compositions, such as polyvinylchloride (PVC) plastisols, that include low VOC viscosity reducing (LVVR) compounds as well as methods of making the VOC composition having reduced viscosity. The LVVR compounds are esters of 2,2,4-trimethyl-1,3-pentane diol (TMPD) represented by the following structure:

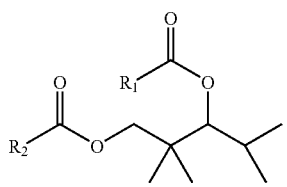

wherein $R_1$ and $R_2$ each represent a C3 to C17 alkyl group. $R_1$ and $R_2$ each can also represent a C5 to C13 alkyl group or even a C7 to C11 alkyl group. In one example of the LVVR compound described above, the combined number of carbons represented by $R_1$ and $R_2$ is between about 9 carbons and 20 carbons or even between about 11 carbons and 17 carbons.

The LVVR compounds according to the present invention can also be derived from the reaction of at least one of 2,2,4-trimethyl-1,3-pentane diol (TMPD); 2,2,4-trimethyl-1,3-pentanediol monoisobutyrate (TXOL or TEXANOL®); and mixtures of TMPD and TXOL with at least one of carboxylic acids, such as 2-ethylhexanoic acid, and fatty acids. The reaction results in a modified TMPD having the two hydroxyl groups replaced with the carboxylic acids and/or fatty acids and/or a modified TXOL having the one hydroxyl group replaced with the carboxylic acid or fatty acid.

Mixtures of TMPD and TXOL can comprise any ratio of TMPD to TXOL. For example, a suitable mixture could include from 1 to 99% TMPD. Likewise, a suitable mixture could include from 1 to 99% TXOL. Mixtures of TMPD and TXOL can also include 50-79% 2,2,4-trimethyl-1,3-pentanediol monoisobutyrate (TXOL) and 5-18% 2,2,4-trimethyl-1,3-pentanediol (TMPD). Such a mixture can also include 14-32% 2,2,4-trimethyl-1,3-pentanediol diisobutyrate (TXIB). Generally, when the above described mixture is esterified with, for example, a carboxylic acid or fatty acid, TXIB is basically unchanged (some transesterification does occur), TMPD becomes a diester of the acid, and TXOL becomes an isobutyrate+that acid diester.

Carboxylic acids useful in the present invention typically have an average carbon chain length of C-6 or higher, for example acids and iso acids from C-6 up to about C-13. Alternatively, the carboxylic acids or fatty acids used to modify the TMPD or TXOL should result in a modified TMPD or a modified TXOL having two ester groups in which the total carbon count of the two ester groups is in the range of about C-10 to about C-20 or from about C-12 to C-18. For example, if one of the two hydroxyl groups on the TMPD has been replaced with a carboxylic acid or fatty acid having 4 carbons, then the other hydroxyl group is replaced by a carboxylic acid or fatty acid having between 6 and 16 carbons.

A non-exhaustive list of suitable carboxylic acids includes 2-ethylhexanoic acid, caproic acid, heptoic acid, caprylic acid, nananoic acid, capric acid, undecanoic acid, lauric acid, tridecanoic acid, myristic acid, pentadecanoic acid, palmytic acid, heptadecanoic acid, and isomers thereof.

Suitable fatty acids include stearic acid, oleic acid, linoleic acid, linolenic acid, gadoleic acid, vaccenic acid, petroselinic acid, arachidonic acid.

The various viscosity reducing compounds can be added to the plastisols at a range of from about 1.0% to about 30%, or at a range of from about 2.0% to about 20%, or even at a range of from about 3.0% to about 15% by weight.

Examples compounds useful in the present invention TXOL 2-ethylhexanoate, TMPD bis-2-ethylhexanoate, TMPD mono 2-ethylhexanoate, TXOL monolaurate and mixtures thereof.

These compounds can be used to produce PVC plastisols with low initial viscosity and excellent viscosity stability. They are high boiling materials and allow the plastisol user to operate a low VOC process. In addition, the low volatility produces more finished product per batch because fewer raw materials are lost to the atmosphere within the manufacturing process resulting in a more efficient process.

The present viscosity reducing compounds may be incorporated in the vinyl chloride resin, along with or without other additions, by any suitable process such as, mixing or kneading of the ingredients. A desirable procedure involves forming a vinyl resin dispersion which can be cast in a film or thicker body, and then heated to form a homogeneous body of plasticized resin. Such dispersions are suspensions of vinyl chloride resin particles in nonaqueous liquids including the plasticizer which do not dissolve the resin at ordinary temperatures but do at elevated temperatures. If the liquid phase consists only of plasticizer, the dispersion is often termed as "plastisol," whereas if the dispersing liquid also contains volatile organic solvents or organic components which evaporate upon heating, the dispersion is often termed as "organosol." Both plastisols and organosols may include other additives, including stabilizers, normally used in vinyl chloride resin compositions. The term "plastisol" as used herein is intended to include both plastisols and organosols.

The viscosity reducing compounds according to this invention may be added at any time and in any convenient manner to the PVC plastisol. If desired, the PVC plastisol and viscosity reducing compounds may be mixed simultaneously, for example, conventional mixing or blending equipment.

The plastisols according to this invention may be used to make numerous products. For example, the plastisols can be used to make resilient vinyl flooring, floor tiles, fabric coating, adhesives, vinyl foams, home furnishings, toys and child care articles, gloves, shoes, building and construction materials, automotive parts and materials, apparel, recreation product, tools, novelties, vinyl wall coverings, etc.

As used throughout this application, the reference to a modified TMPD, TXOL or other molecule as the "reaction product" of specified reactants is provided as a convenient way to describe the structure of the molecule, and not as a limitation to molecules made by specific methods or using specific reactants. Thus, any molecule having the molecular structure described by reference to a reaction product, but obtained by other methods or from other reactants, will be within the meaning of "reaction product" as that term is used throughout this application.

The following examples are submitted for a better understanding of the invention.

EXAMPLES

Exemplary data are shown.

Plastisol Formulations for Experimental Plasticisers

Plastisol #1

| Ingredient | Parts (gms) |
| --- | --- |
| Vinnolit C65V | 16.75 |
| Solvin 382 NG | 142.4 |
| Jayflex 77 | 31.4 |
| DINP | 16.3 |
| Plasticiser | 31.8 |
| ZnO | 6 |
| Lankroflex ED6 | 5 |

| Sample | Plasticiser |
| --- | --- |
| #1 | TXIB |
| #2 | TXOL-2EH/TMPD-di-2EH mixture |
| #3 | TMPD-di-2EH |
| #4 | TXOL-2EH |

Viscosity Results

| Sample | Initial Viscosity (Cps) | 48 Hrs | 12 Days |
| --- | --- | --- | --- |
| #1 | 1440 | 1600 | 2040 |
| #2 | 2040 | 2010 | 2800 |
| #3 | 2160 | 2280 | 2830 |
| #4 | 2040 | 1970 | 2420 |

Plastisol #2

| Ingredient | Parts (gms) |
| --- | --- |
| Lavocy PH 1704H | 140 |
| Vinnolit C65V | 60 |
| Jayflex 77 | 40 |
| Santiciser 160 | 30 |
| Plasticizer | 10 |
| ZnO | 6 |
| Lancroflex ED6 | 5 |

| Sample | Plasticiser |
| --- | --- |
| Sample A | TXIB |
| Sample B | TXOL-2EH/TMPD-di-2EH mixture |
| Sample C | TMPD-di-2EH |
| Sample D | TXOL-2EH |

| Sample | Initial Viscosity (Cps) | 48 hrs | 12 days |
| --- | --- | --- | --- |
| A | 7200 | 10140 | 43000 |
| B | 7260 | 9720 | 33400 |
| C | 7490 | 9740 | 29000 |
| D | 7000 | 8960 | 33000 |

The samples were further analyzed to determine volatility of the samples as compared to TXIB as well the performance of the samples compared to an industrial internal standard. The results are shown in the Figures as explained below. FIG. 1 shows TGA curves which show that the three experimental samples are less volatile than TXIB. Moreover, FIG. 2 shows a graph which shows the performance of the experimental compounds compared to Hexadecane and C-11 alkane, an internal standard at Tarkett, a market leader in Europe. In this test, the compound must be to the right of hexadecane.

Table 1 below shows thermogravimetric Analysis (TGA) of various embodiments of the present invention. TGA is used to determine the amount of weight change of a known mass of material as a function of time or temperature in a controlled atmosphere. The analysis can be run isothermally or the temperature can be ramped from low to high temperatures.

In the case of the ramped experiment, materials with lower volatility will lose 10% of their weight at higher temperatures than higher volatility materials.

In the isothermal experiment, the lower the volatility, the higher the % weight retained after 65 minutes.

For the low volatility viscosity reducers, both isothermal data and ramped data show that Texanol Monolaurate, TMPD di 2EH, and Texanol 2EH are less volatile than TXIB.

TABLE 1

TGA DATA

| | Ramped 10% Wt Loss ° C. | Isothermal Weight Retention after 65 min @ 120° C. % |
| --- | --- | --- |
| TXIB | 133 | 0.0 |
| Texanol Monolaurate | 221 | 98.0 |

TABLE 1-continued

TGA DATA

|  | Ramped 10% Wt Loss ° C. | Isothermal Weight Retention after 65 min @ 120° C. % |
| --- | --- | --- |
| TMPD di 2EH | 209 | 95.4 |
| Texanol 2EH | 164 | 64.8 |

Table 2 contains physical property data for the plasticizers. As can be seen, all of the plasticizers are low in viscosity in the pure state.

TABLE 2

PHYSICAL PROPERTIES

|  | MW (g) | Density (g/ml) | Viscosity cps @ 25° C. |
| --- | --- | --- | --- |
| TXIB | 286.41 | 0.941 | 5 |
| Texanol Monolaurate | 398.62 | 0.909 | 14 |
| TMPD di 2EH | 398.62 | 0.920 | 22 |
| Texanol 2EH | 342.51 | 0.9266 | 11.3 |

Table 3 shows the formulations used to make plastisols containing 38 PHR of typical primary plasticizer and 12 PHR of the viscosity reducing plasticizer. The Brookfield viscosity data, taken at 2 different shear rates, shows that Texanol monolaurate, TMPD di 2EH, and Texanol 2EH all produce plastisols with similar viscosity and the plastisols show similar aging characteristics as the TXIB plastisol.

TABLE 3

BROOKFIELD VISCOSITIES

|  | Sample | | | |
| --- | --- | --- | --- | --- |
|  | 1 PHR | 2 PHR | 3 PHR | 4 PHR |
| Ingredient | | | | |
| Oxy 654 Resin | 80 | 80 | 80 | 80 |
| Oxy 625 Resin | 20 | 20 | 20 | 20 |
| Eastman 168 | 38 | 38 | 38 | 38 |
| Texanol monolaurate | 12 | — | — | — |
| TMPD di 2EH | — | 12 | — | — |
| Texanol 2EH | — | — | 12 | — |
| TXIB | — | — | — | 12 |
| Drapex 6.8 | 2 | 2 | 2 | 2 |
| Across LT 4798 | 3 | 3 | 3 | 3 |
| Brookfield Visc, 2.5 rpm | | | | |
| 1 Hour | 3040 | 3360 | 3040 | 2720 |
| 1 Day | 3200 | 3680 | 3680 | 3520 |
| 1 Week | 4000 | 3840 | 4480 | 4000 |
| 2 Week | 3840 | 4160 | 4640 | 4480 |
| Brookfield Visc, 20 rpm | | | | |
| 1 Hour | 2960 | 3220 | 2960 | 2500 |
| 1 Day | 3300 | 3660 | 3660 | 3120 |
| 1 Week | 4000 | 4140 | 4040 | 3620 |
| 2 Week | 3880 | 4340 | 4180 | 4020 |

The invention has been described in detail with particular reference to certain exemplary embodiments thereof, but it will be understood that variations and modifications can be effected within the spirit and scope of the invention.

We claim:

1. A polyvinyichloride plastisol composition comprising a polyvinyichloride resin, a plasticizer, and a viscosity reducing compound, wherein said compound is represented by the following structure:

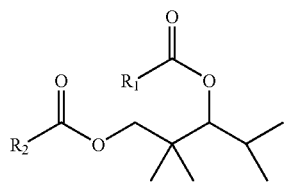

wherein a total number of carbons represented by $R_1$ and $R_2$ is between about 9 carbons and 20 carbons.

2. The composition according to claim 1, wherein $R_1$ and $R_2$ each represent a C5 to C13 alkyl group.

3. The composition according to claim 2, wherein $R_1$ and $R_2$ each represent a C7 to C11 alkyl group.

4. The composition according to claim 1, wherein the total number of carbons represented by $R_1$ and $R_2$ is between about 11 carbons and 17 carbons.

5. A polyvinylchloride plastisol composition comprising a polyvinylchloride resin, a plasticizer, and a viscosity reducing compound, wherein said compound is a diester derived from the reaction of:
   a) at least one of 2,2,4-trimethyl-1,3-pentane diol (TMPD) and 2,2,4-trimethyl-1,3-pentanediol monoisobutyrate (TXOL); and
   b) an alkyl carboxylic acid, a fatty acid, or a mixture thereof, wherein the carboxylic acid or fatty acid consists of 8-20 carbon atoms.

6. The composition according to claim 5, wherein the carboxylic acid is selected from the group consisting of 2-ethylhexanoic acid, caproic acid, heptoic acid, caprylic acid, nananoic acid, capric acid, undecanoic acid, lauric acid, tridecanoic acid, myristic acid, pentadecanoic acid, palmytic acid, heptadecanoic acid, and mixtures thereof.

7. The composition according to claim 5, wherein the fatty acid is selected from the group consisting of stearic acid, oleic acid, linoleic acid, linolenic acid, gadoleic acid, vaccenic acid, petroselinic acid, arachidonic acid.

8. The composition according to claim 5, wherein the diester has two ester groups wherein the two ester groups have a combined carbon count of from about 10-20 carbon atoms.

9. The composition according to claim 8, wherein the ester groups have a combined carbon count of from about 12-18 carbon atoms.

10. The composition according to claim 5, wherein the viscosity reducing compound is at least one of TXOL 2-ethylhexanoate, TMPD bis-2-ethylhexanoate, TMPD mono 2-ethylhexanoate and TXOL monolaurate.

11. The composition according to claim 5, wherein the viscosity reducing compound is present in an amount of from about 1.0% to about 30% by weight.

12. The composition according to claim 11, wherein the viscosity reducing compound is present in an amount of from about 2.0% to about 20% by weight.

13. The composition according to claim 12, wherein the viscosity reducing compound is present in an amount of from about 3.0% to about 15% by weight.

14. A method of producing a polyvinyl chloride (PVC) plastisol composition having a reduced viscosity comprising contacting the plastisol composition and a viscosity reducing compound, wherein said compound is represented by the following structure:

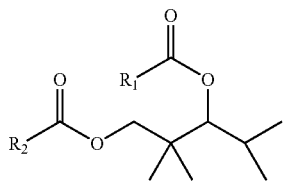

wherein a total number of carbons represented by $R_1$ and $R_2$ is between about 9 carbons and 20 carbons.

15. The method according to claim 14, wherein $R_1$ and $R_2$ each represent a C5 to C13 alkyl group.

16. The method according to claim 15, wherein $R_1$ and $R_2$ each represent a C7 to C11 alkyl group.

17. The method according to claim 14, wherein the total number of carbons represented by $R_1$ and $R_2$ is between about 11 carbons and 17 carbons.

18. A method of producing a polyvinylchloride plastisol composition having a reduced viscosity comprising contacting:
 a) a polyvinylchloride plastisol; and
 b) a viscosity reducing compound wherein said compound is a diester derived from the reaction of:
  i) at least one of 2,2,4-trimethyl-1,3-pentane diol (TMPD) and 2,2,4-trimethyl-1,3-pentanediol monoisobutyrate (TXOL); and
  ii) an alkyl carboxylic acid, a fatty acid, or a mixture thereof,
 wherein the carboxylic acid or fatty acid consists of all isomers of 8-20 carbon atoms.

19. The method according to claim 18, wherein the carboxylic acid is selected from the group consisting of 2-ethylhexanoic acid, caproic acid, heptoic acid, caprylic acid, nananoic acid, capric acid, undecanoic acid, lauric acid, tridecanoic acid, myristic acid, pentadecanoic acid, palmytic acid, heptadecanoic acid, and mixtures thereof.

20. The method according to claim 18, wherein the fatty acid is selected from the group consisting of stearic acid, oleic acid, linoleic acid, linolenic acid, gadoleic acid, vaccenic acid, petroselinic acid, arachidonic acid.

21. The method according to claim 18, wherein the diester has two ester groups wherein the two ester side chains have a combined carbon count of from about 10-20 carbon atoms.

22. The method according to claim 21, wherein the diester has two ester chains having a combined carbon count of from about 12-18 carbon atoms.

23. The method according to claim 18, wherein the viscosity reducing compound is at least one of TXOL 2-ethylhexanoate, TMPD bis-2-ethylhexanoate TMPD mono 2-ethylhexanoate, and TXOL monolaurate.

24. The method according to claim 18, wherein the viscosity reducing compound is present in an amount of from about 1.0% to about 30% by weight.

25. The method according to claim 24, wherein the viscosity reducing compound is present in an amount of from about 2.0% to about 20% by weight.

26. The method according to claim 25, wherein the viscosity reducing compound is present in an amount of from about 3.0% to about 15% by weight.

27. An article of manufacture comprising the composition according to claim 1.

28. The article of manufacture according to claim 27, wherein said article is selected from the group consisting of a floor covering, a tile, a fabric, a fabric coating, an adhesive, a vinyl foam, a toy, a glove, a shoe, and a wall covering.

* * * * *

UNITED STATES PATENT AND TRADEMARK OFFICE
CERTIFICATE OF CORRECTION

PATENT NO. : 7,741,395 B2
APPLICATION NO. : 11/842631
DATED : June 22, 2010
INVENTOR(S) : Holt et al.

It is certified that error appears in the above-identified patent and that said Letters Patent is hereby corrected as shown below:

Column 8, Claim 1, Lines 2 and 3 "polyvinyichloride" should read --polyvinylchloride--.

Signed and Sealed this

Thirtieth Day of November, 2010

David J. Kappos
*Director of the United States Patent and Trademark Office*